Patented Apr. 18, 1933                                                           1,904,257

UNITED STATES PATENT OFFICE

ARTHUR STOLL AND ERNST ROTHLIN, OF BASEL, SWITZERLAND, ASSIGNORS TO THE FIRM OF "CHEMICAL WORKS FORMERLY SANDOZ," OF BASEL, SWITZERLAND

SUPERSATURATED CALCIUM GLUCONATE SOLUTION

No Drawing. Application filed October 16, 1929, Serial No. 400,157, and in Germany October 29, 1928.

In the U. S. patent application Ser. No. 222,946, filed September 29, 1927, a process is described which relates to preventing the crystallization of supersaturated solutions of pure calcium gluconate.

It has now been found that it is possible to prevent the crystallization of supersaturated calcium gluconate solutions, even in presence of other compounds or therapeutically useful substances dissolved therein, for instance in presence of strong electrolytes, by the same process described in the above mentioned application, that is to say by subjecting the solutions with the additions dissolved therein, after having introduced same into containers adapted to be hermetically closed, to such a heating operation that after cooling no further crystallization takes place. Under these conditions, the expected salting action of the additions does not occur.

This invention is very important for the therapy, as it allows to administer by way of the parenteral injection, all sorts of injection-preparations together with the calcium gluconate-solutions, the last being less dangerous or irritating compared to calcium chloride. The calcium gluconate fulfils in many cases the requirement of helping or smoothing the therapeutical action of the admixtures.

To clearly show the great variability of our new process, the following compounds which may be added to the calcium gluconate solutions are cited: Metal salts of the alkali and earth-alkali group, such as sodium chloride, sodium salicylate, sodium glycerophosphate, sodium cacodylate, sodium cholate, sodium nucleinate, lithium citrate, calcium glycerophosphate, strontium gluconate; salts of heavy metals such as cadmium gluconate, iron gluconate, the usual combinations of iron with arsenic, nickel gluconate, suitable manganese-, arsen-, antimony-, mercury- and silver compounds, bismuth; further alkaloids, for instance suitable salts of atropin, quinine, quinoline-derivatives like halogen-oxy-quinolinesulfonic acids, and also 5-alkoxy-8-aminoquinolines and their N-substitution products, salts of codeine, cotarnine, emetine, ephedrine, ergotamine, hydrastine, papaverine, pilocarpine, sparteine, strychnine; caffeine and theobromine and their double compounds with sodiumbenzoate- or salicylate; dyestuffs which are used in the chemical-therapy like for instance Methylene blue, Trypan blue, acridine-dyestuffs; natural glucosides such as digitoxine, strophantine; also soluble compounds of substituted barbituric acids and of antipyretica, further local anæsthetica of the aminobenzoic acid series, and also a series of different compounds which are used in the injection therapy like glycerine, glucose, gelatine, paraldehyde, hexamethylenetetramine, thyroxine, pyridine-beta-carbonic acid diethylamide, pentamethylenetetrazol, alkylated cyclic ketones, camphor and most of the sterines, for instance ergosterine and others.

Unsuitable are such additions which possess too little solubility or which react with calcium gluconate and produce difficultly soluble compounds, and also such which show a loss of their therapeutical action when heated at temperatures which are necessary to stabilize the supersaturated calcium gluconate solutions.

We have further found that it is not necessary in all cases to heat the sealed ampoules at a temperature of 100° C. Sometimes one or several heating operations at 50–70° C. are sufficient to prepare stable super-saturated calcium gluconate solutions. This is very important especially in the case when heat sensitive compounds are used together with the calcium gluconate.

The following examples illustrate the invention:

*Example 1.*—200 g. of calcium gluconate are dissolved in 1500 cc. of hot water, 200 g. of pure sodium chloride are added, and the solution is then diluted to 2000 cc. The hot solution thus obtained is then filled in ampoules, which, after sealing, are heated twice during two hours at intervals of a day at 95° C. Thus, the solution in the ampoules is stabilized and does not, even after several months, show any precipitation.

*Example 2.*—10 g. of calcium gluconate and 20 g. of sodiumsalicylate are dissolved in 100 cc. of hot water and filled in ampoules, which, after sealing, are heated three times for one hour at intervals of a day at 70°. The solution in the ampoules remains perfectly clear; this would not be the case of ampoules which have not been heated and where a crystallization of calcium gluconate takes place very soon.

*Example 3.*—Equal parts of magnesium gluconate and calcium gluconate are dissolved in such a quantity of hot water, that the solution when cooled down, contains in 10 cc. one gram of each of the salts. The hot solution is filled up in ampoules, which are heated twice during two hours at intervals of a day at 95° C. The solution, when cooled, does not give any precipitate.

*Example 4.*—A stable calcium- and strontium gluconate solution may be prepared if 5 g. of calcium gluconate and 5 g. of strontium gluconate are dissolved in 100 cc. of hot water, the hot solution poured into ampoules which are further heated at 80–90° C. one or several times, until the solution remains perfectly clear after long storage.

*Example 5.*—Similarly to the above cited example, a stable solution may be prepared by dissolving 1 gram of cadmium gluconate or nickel gluconate or iron gluconate in 100 cc. of a hot 10 per cent solution of calcium gluconate, filling up the hot solution in ampoules and heating same as described.

*Example 6.*—0.5 g. of tartar emetic are dissolved in 100 cc. of a 10 per cent solution of calcium gluconate. The hot solution is introduced into ampoules or bottles which are then hermetically closed and heated several times at short intervals for one or two hours at 60–90° C. The solution remains perfectly clear after cooling.

*Example 7.*—0.3 g. of codeine hydrochloride or 5.0 g. of quinine hydrochloride or 2.0 g. of caffeine or 0.2 g. of cotarnine hydrochloride are dissolved in 100 cc. of a hot 10 per cent solution of calcium gluconate, the hot solution is then filled up into suitable containers, which are then hermetically closed and heated several times during one hour at 60–70° C. at intervals of a day. The solutions do not show any crystallization after cooling down, whilst containers which contain the same solution and which have not been heated soon show very strong precipitations of calcium gluconate.

*Example 8.*—7.5 g. of caffeine-sodium salicylate dissolved in 100 cc. of a hot 10% solution of calcium gluconate give stable solutions when proceeded as described above.

*Example 9.*—1.0 g. of medicinal Methylene blue, or 1.0 g. of Trypan blue or 2.0 g. of 2-ethoxy-6:9-diamino acridinum lactate are dissolved in 100 cc. of a hot 10 per cent solution of calcium gluconate, and filled when hot into suitable containers, for instance bottles or ampoules, which after being hermetically closed are heated several times at a temperature of 50–95° C. The solutions thus obtained even after long storage do not show any precipitation.

*Example 10.*—1.0 g. of the methylsulfonic acid salt of p-aminobenzoic acid-diethylamineleucinolester are dissolved in 100 cc. of a hot 10 per cent solution of calcium gluconate. After heating two or three times at a temperature of 60–70° C. for one hour, the solution is stabilized.

*Example 11.*—Solutions prepared by dissolving in 100 cc. of a 10 per cent solution of calcium gluconate for instance 10.0 g. of hexamethylenetetramine or 10 g. of glycerine or 10 g. of gelatine or even 30 g. of glucose, may be stabilized, when prepared as described above.

What we claim is:—

As new composition of matter, clear, stable, sterile and supersaturated aqueous calcium gluconate solutions, containing 4–10% of calcium gluconate and such therapeutically useful compounds, that are heat insensitive and incapable of reacting with calcium gluconate, which solutions possess excellent therapeutical properties and may be used for intramuscular injections free from irritation of the tissues.

In witness whereof we have hereunto signed our names this 7th day of October, 1929.

ARTHUR STOLL.
ERNST ROTHLIN.